US005673560A

United States Patent [19]

Hope

[11] Patent Number: 5,673,560
[45] Date of Patent: *Oct. 7, 1997

[54] COOLING FOR GAS TURBINE-TWO STROKE PISTON COMPOUND ENGINE

[75] Inventor: Jack I. Hope, Hillsboro, Ohio

[73] Assignee: Haeco Partners, Ltd., Hillsboro, Ohio

[*] Notice: The term of this patent shall not extend beyond the expiration date of Pat. No. 5,555,730.

[21] Appl. No.: 713,806

[22] Filed: Sep. 13, 1996

Related U.S. Application Data

[63] Continuation of Ser. No. 391,046, Feb. 21, 1995, Pat. No. 5,555,730, which is a continuation-in-part of Ser. No. 328,121, Oct. 24, 1994.

[51] Int. Cl.⁶ .............................. F02B 37/20; F01P 1/06
[52] U.S. Cl. ...................... 60/606; 123/41.73; 123/41.85
[58] Field of Search ........................... 60/606; 123/41.73, 123/41.85

[56] References Cited

U.S. PATENT DOCUMENTS

| | | |
|---|---|---|
| 1,389,780 | 9/1921 | Peck . |
| 1,873,119 | 8/1932 | Griswold . |
| 2,583,651 | 1/1952 | Horning . |
| 3,102,381 | 9/1963 | Tryhorn . |
| 3,498,053 | 3/1970 | Johnston . |
| 4,543,916 | 10/1985 | Giorno . |
| 5,453,573 | 9/1995 | Callas . |

FOREIGN PATENT DOCUMENTS

| | | | |
|---|---|---|---|
| 1278793 | 9/1968 | Germany . | |
| 4244301 | 6/1994 | Germany . | |
| 992769 | 1/1983 | U.S.S.R. | 60/606 |
| 6718 | of 0000 | United Kingdom | 123/41.73 |
| 360382 | 4/1930 | United Kingdom . | |

OTHER PUBLICATIONS

"A New Concept for Reduced Fuel Consumption in Internal Combustion Engines", by Jack I. Hope and Robert D. Johnston, Engine Systems, Inc., Reprinted Aug. 1971 from 1971 Intersociety Energy Conversion Engineering Conference Proceedings, p. 38 by Society of Automotive Engineers, Inc., New York, N.Y.

"A Diabatic Engine Program" presented by Dr. Walter Bryzik, Automotive Technology Development Contractors' Coordination Mtg., 11/11-14/80, Dearborn, Mich.

"Gas Turbine/Diesel Compound Engine (Giesel) Design-Fabrication-Test", Contract DAAE07-83-C-R093, Dec. 1988, by Jack I. Hope and Robert Graham, pub. By U.S. Army Tank-Automotive Command, Warren, Mich.

*Primary Examiner*—Michael Koczo
*Attorney, Agent, or Firm*—Wood, Herron & Evans, L.L.P.

[57] ABSTRACT

A compound engine that includes a gas turbine unit and a piston unit wherein the cycle air for the piston unit is diverted through cooling passages to provide impingement cooling of several areas of the piston unit including the upper cylinder area, the outer and inner surfaces of the exhaust valve and other selected areas of the cylinder head.

30 Claims, 4 Drawing Sheets

COOLING FOR GAS TURBINE-TWO STROKE PISTON COMPOUND ENGINE

This application is a continuation of U.S. patent application Ser. No. 08/391,046 filed on Feb. 21, 1995, now U.S. Pat. No. 5,555,730 for "Improved Cooling For Gas Turbine—Two Stroke Piston Compound Engine" which in turn is a continuation-in-part of U.S. patent application Ser. No. 08/328,121 filed on Oct. 24, 1994 for "Gas Turbine—Two Stroke Piston Compound Engine", all of the above having the same assignee of the present invention.

BACKGROUND OF THE INVENTION

1. Field of the Invention

The invention relates generally to compound engines, and more particularly, to a compound engine comprised of a combination of gas turbine unit and a piston unit which are both drivingly connected to an output drive shaft.

2. Background of the Invention

An early compound engine that is comprised of a gas turbine unit and a piston unit is disclosed in the Johnston U.S. Pat. No. 3,498,053. In Johnston, the turbine unit is operated by the exhaust gases from a reciprocating two cycle, compression ignition, piston unit. The gas turbine unit of Johnston has a compressor component to supercharge the piston unit, and the turbine unit is also coupled to the output shaft of the piston unit. The Johnston piston unit has pairs of opposed cylinders with a scotch yoke connecting the pistons to a crankshaft.

A subsequent version of the compound engine is described in a publication entitled "A New Concept For Reduced Fuel Consumption In Internal Combustion Engines" presented at the 1971 Intersociety Energy Conversion Engineering Conference Proceedings, P38, by the Society of Automotive Engineers. This publication discloses a low pressure turbine mechanically coupled to the output shaft of the piston unit and fluidly driven by the output of a high pressure turbine unit. The piston unit is a compression ignition two-stroke unit in which excess scavenge air flow in the valve-open portion of the stroke is used to internally cool the piston and cylinder. The exhaust valve is an annular valve located at the top of the cylinder and forms a portion of the wall of the combustion chamber. A bypass burner, that is, a thermal reactor, is placed in a parallel flow path between the high pressure compressor and high pressure turbine. To start the engine, a small starter motor spins the high pressure turbine, and combustion is initiated in the bypass burner. The bypass burner then becomes the combustion system to provide a driving gas for the high pressure turbine. The high pressure turbine first, mechanically drives the compressor to provide high pressure air to the piston unit, and second, provides a driving gas to the low pressure turbine which, in turn, provides cranking power to start the piston unit.

It is generally a common design objective of all engines to optimize engine efficiency. A compound engine as generally described above is designed to have a fairly constant pressure drop, for example, five percent, maintained across the piston unit at most power settings. It is desirable that all cooling in such a unit be provided by the cycle air and that no external cooling mechanisms be used. To do so it is desirable to divert small amounts of cycle air through passages in the cylinder and cylinder head directly onto the exhaust valve seat and through the center body and cylinder head to cool selected areas therein. In such an engine it is desirable that temperature levels be maintained high, for example, 1200° F.–1500° F. in the combustion chamber area and 600° F.–700° F. in the top ring area, which reduces the amount of bypass cooling air and allows it to pick up energy that can, upon reentering the cycle in the exhaust manifold, be recovered in the downstream turbine.

While the above cooling arrangement can be effective, it does present additional problems. For example, piston rings must be located a substantial distance below the hot top end of the piston. Temperatures at the top of the cylinder wall adjacent the combustion chamber are so high that they do not permit the piston rings to be located closer to the outer end of the piston. Further, the high cylinder wall temperatures also require that a relatively thick insulating cap be mounted on the end of the piston. Consequently, the physical length of piston and the associated cylinder are substantially longer than would be required if the temperature of the wall of the cylinder adjacent the combustion chamber were lower. Therefore, the resulting engine design with the larger piston and cylinder unit weighs more and has the disadvantage of requiring more energy to move the piston, thereby reducing the efficiency of the engine. In addition, the physically longer piston and cylinder components require more material to manufacture and are more expensive. Further, the larger pistons require other components to be large, thereby increasing the overall size and weight of the engine.

Similarly, cooling of the cylinder head and center body by simply circulating the cooling fluid through internal passages requires that those components be more massive and made of more expensive heat tolerant materials than if their cooling were more effective. Therefore, the inability of the cooling system to more efficiently extract heat from those components presents certain limitations in improving component design so that the overall efficiency of the engine may be improved.

Accordingly, there remains a need for more effective cooling of, and a general removal of heat energy from, compound engine components immediately adjacent the combustion chamber of the piston unit.

SUMMARY OF THE INVENTION

To overcome the above inherent inefficiencies of conventional piston engines, an object of the present invention is to provide a compound engine that is more efficient than prior compound engines.

Another object of the present invention is to provide a cooling system for a compound engine with significantly improved heat transfer mechanisms to provide the necessary cooling with less cooling fluid.

Another object of the present invention is to provide a compound engine that provides better control of high temperature portions of the piston unit which allows more efficient engine design and smaller and lighter engine components.

Another object of the present invention is to provide a compound engine that highly effectively cools selected areas of the engine experiencing higher temperatures of operation thereby extending the life of engine components proximate those areas.

A further object of the invention is to provide a compound engine that further increases its efficiency by converting the heat energy in the cooling air to output power.

According to the principles of the invention, there is provided a compound engine including a gas turbine unit and a piston unit that selectively impinges cooling air taken from the cycle air on areas of the engine that require more efficient cooling and further exhausts the heated cooling air to the gas turbine unit which uses the heated cooling air to drive an output shaft from the engine.

In one embodiment of the invention, cooling air is diverted from the cycle air in the intake manifold of the piston unit to a first plurality of impingement cooling holes that direct the cooling air at a high velocity against a portion of the exterior cylinder wall proximate the combustion chamber. The use of the impingement cooling at the end of the cylinder wall adjacent the combustion chamber maintains that area of the cylinder wall at a temperature substantially lower than previously possible. Consequently, the piston rings may be moved closer to the end of the piston to a position adjacent that portion of the cylinder wall, and the high temperature insulating cap on the piston may be reduced in size. Further, by holding the end of the cylinder wall adjacent the combustion chamber at a lower temperature, the length of the piston, the length of the cylinder wall and hence, the length of the entire piston unit may be substantially reduced. Therefore the piston unit may be made with less material which reduces cost and permits the engine to operate more efficiently. Further, because more heat is being removed from the cylinder wall per volumetric unit of cooling air, the cooling process is substantially more efficient. An advantage of reducing the flow volume of cooling fluid is a more efficiently operating compound engine.

In a further embodiment of the invention, a second plurality of impingement cooling holes directs high velocity cycle air against critical areas of an outer surface of the exhaust valve. Such critical areas may be portions of the exhaust valve adjacent the combustion chamber and outer surfaces of the exhaust valve which are in sliding contact with sealing rings. The impingement cooling process is more efficient than simply circulating cooling air through a passage; and therefore, external surfaces of the exhaust valve may be held at lower temperatures, or, alternatively, maintained at the same temperatures with less cooling fluid. The net result is that the exhaust valve body is maintained at a lower temperature which will have the advantage of providing longer exhaust valve life.

In a still further embodiment of the invention, cooling fluid is carried in cooling passages extending through the center body inside the exhaust valve. Impingement cooling may be used to cool selected inner surfaces of the exhaust valve to further remove heat from the exhaust valve and improve its life. In addition, impingement cooling in the center body may be used to cool the bottom of the center body adjacent to the combustion chamber. Cooling the bottom of the center body is effective to maintain that end of the center body at a lower temperature thereby permitting the use of less temperature tolerant materials and a smaller insulating high temperature cap at that end of the center body. Therefore, the improved temperature control of that end of the center body has the advantage of reducing the size of components and permitting the use of less temperature tolerant materials thereby permitting a more cost effective design.

Further, impingement cooling within the center body may be used to cool a fuel line that extends through the center body. That cooling permits a better regulation of the temperature of fuel passing through the injector thereby permitting the temperature of the fuel entering the combustion chamber to be more uniformly and precisely controlled. By better controlling the temperature of the fuel, the efficiency of the combustion process is better controlled with the advantage of providing more efficient engine operation.

These and other objects and advantages of the present invention will become more readily apparent during the following detailed description, together with the drawings herein.

DETAILED DESCRIPTION OF THE INVENTION

Figure 1:
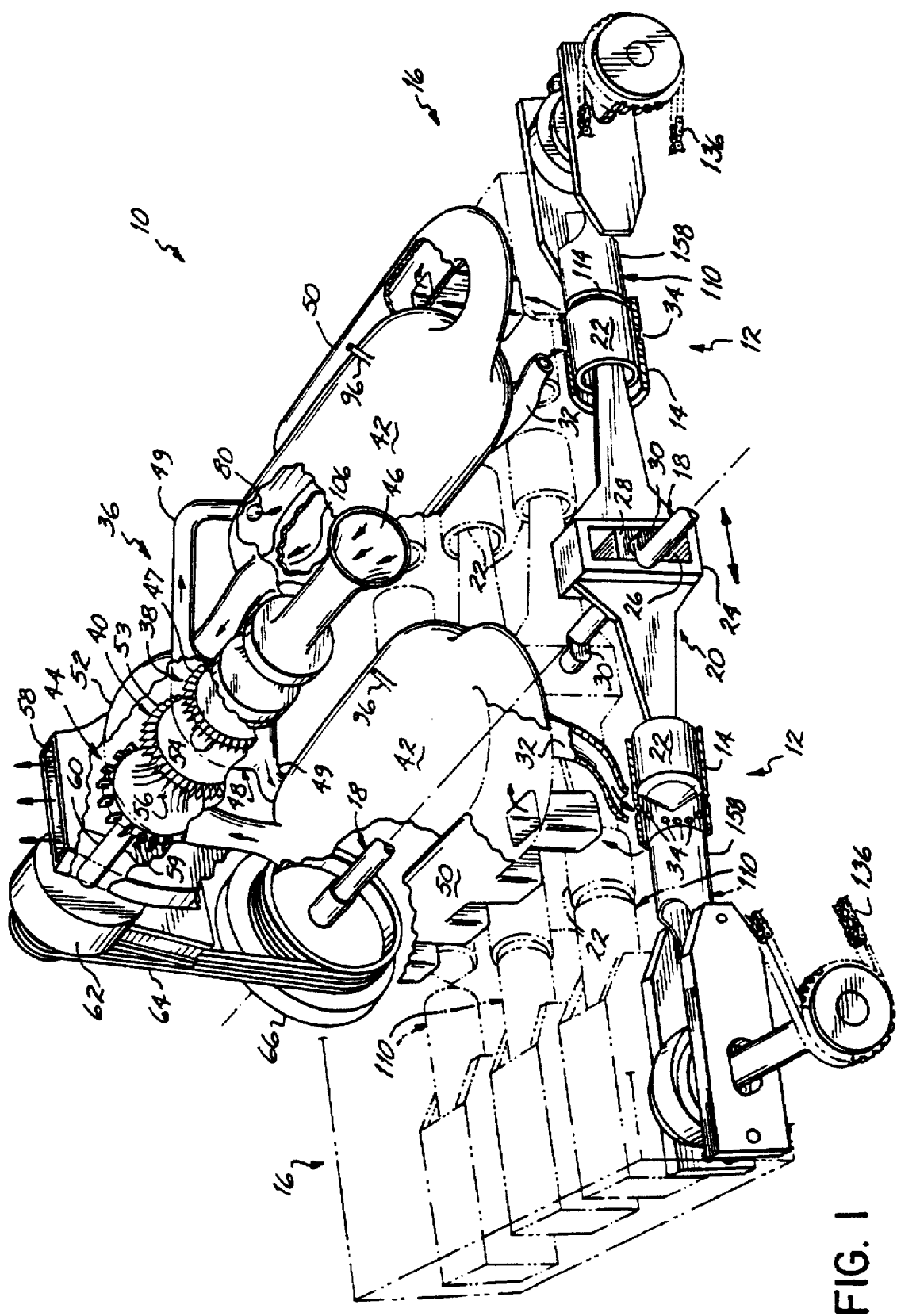
FIG. 1 is a diagrammatic perspective view of a compound engine according to one preferred embodiment of the present invention.
Figure 2:
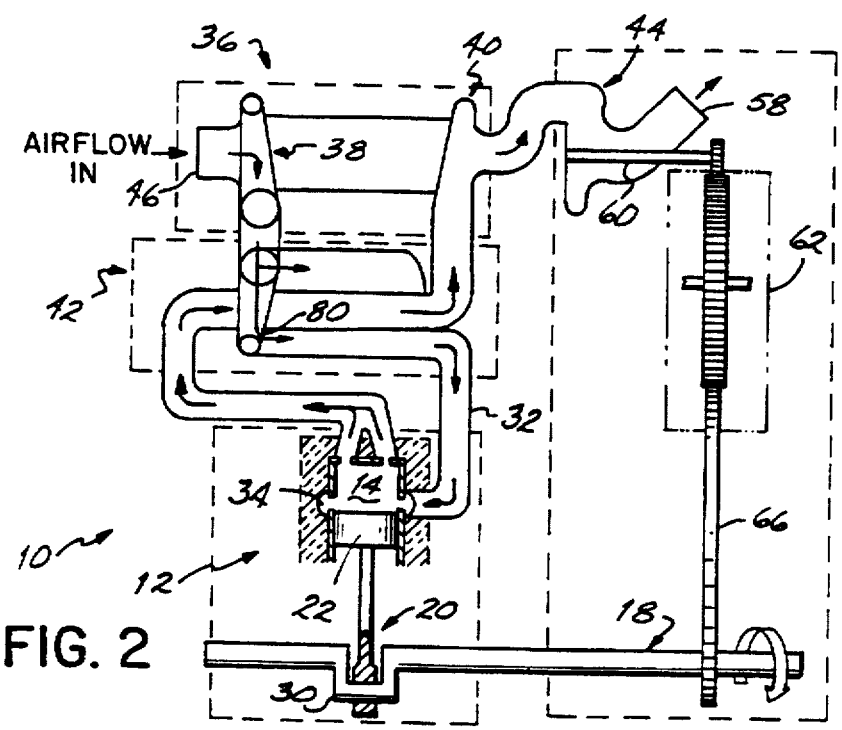
FIG. 2 is simplified schematic diagram of the engine of FIG. 1.
Figure 3:
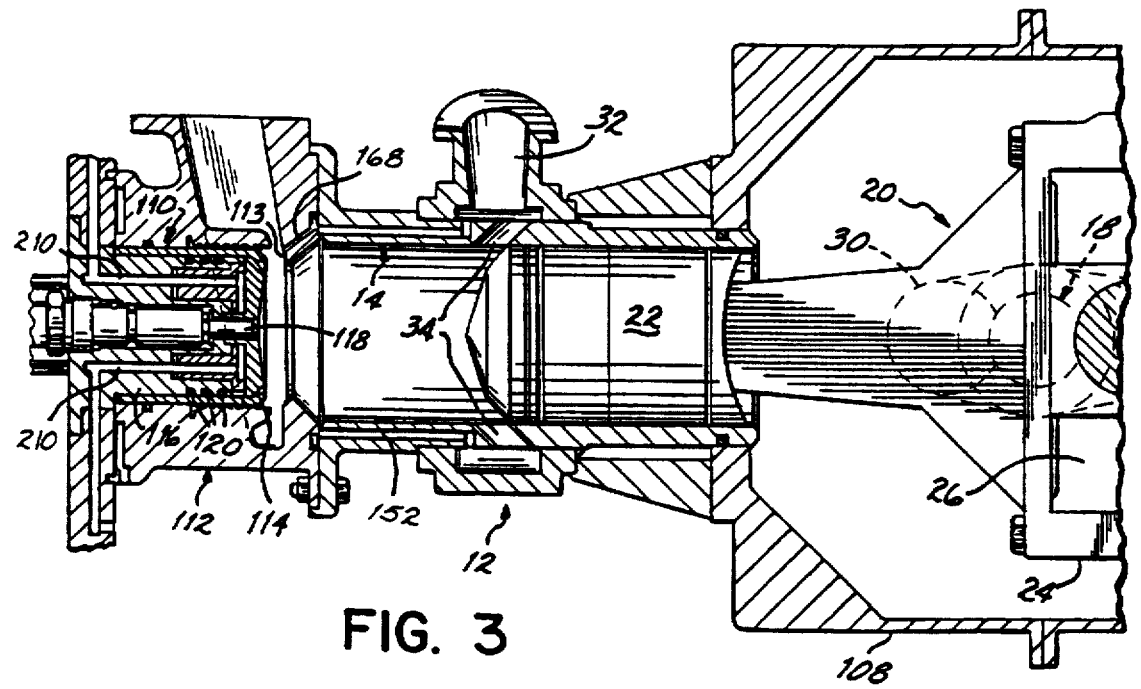
FIG. 3 is a partial cross-sectional view illustrating the piston and cylinder and scotch yoke assembly.

Referring to FIGS. 1, 2 and 3, the compound engine 10 is comprised of a piston unit 12 and a gas turbine unit 36. The piston unit 12 is preferably a compression ignition, two-stroke, uniflow scavenge unit which includes a plurality of piston and cylinder assemblies. The plurality of piston and cylinder assemblies include opposed pairs of cylinders 14, preferably eight cylinders. The opposed pairs of cylinders 14 are arranged in two banks 16, one cylinder 14 of one bank 16 is directly opposite one cylinder 14 of the other bank 16. Each pair of the cylinders 14 is drivably connected to the crankshaft 18 by means of a scotch yoke 20. Each cylinder 14 contains a piston 22 rigidly connected to one end of the scotch yoke 20. The scotch yoke 20 has a crosshead 24 with a rectangular slot 26 that has a slider block 28 slidably mounted therein which is rotatably coupled to an eccentric 30 of the crankshaft 18. The cylinders 14 are generally identical, and each pair of cylinders 14 with interconnecting scotch yoke 20 are generally identical. Similarly, the bank 16 of cylinders 14 generally identical, being mirror images of each other. The piston unit 12 of the compound engine 10 is a two-stroke compression ignition diesel unit to each cylinder 14 of which combustion or cycle air is fed through an intake manifold 32 and air intake ports 34 when its respective piston 22 is in the bottom-most portion of its stroke.

The cycle air is supplied by a high pressure gas turbine unit 36 comprised of a steady flow high pressure compressor 38, a high pressure turbine 40, a pair of combustors 42 and an axial flow low pressure turbine 44. In the preferred embodiment, the high pressure compressor 38 receives cycle air through an inlet 46; and the air passes through vanes of a compressor rotor 47 and through a discharge scroll 48 that divides the compressed air into two discharge paths 49,49, each of which routes the air to one of the two combustors 42. The turbine unit 36 is configured such that exhaust gases from the cylinders 14 of each bank 16 of the piston unit 12 pass through one of a pair of exhaust manifolds 50, respectively associated with each bank 16, and through a respective one of the two bypass combustors 42 of the gas turbine unit 36. The combustors 42 are configured to drive the high pressure turbine 40 by routing the exhaust gases from the combustors 42 to the two entrances on each side of the engine of a dual inlet variable area turbine nozzle scroll 52 and through the vanes of the high pressure turbine rotor 53. The high pressure turbine 40 output shaft is connected to a bearing and shaft assembly 54 to drivably rotate the high pressure compressor 38. The high pressure turbine 40 has variable inlet vanes (not shown) which vary the inlet area of the high pressure turbine to permit, the high pressure turbine 40 to run at 100% of its desired speed even at lower speeds of the piston unit 12 which produce significantly less exhaust gases. The outlet of the high pressure turbine 40 is fluidly connected to a conically shaped diffuser 56 which is connected to the inlet of the axial flow low pressure turbine 44. Variable vanes (not shown) may be utilized on the input of the low pressure turbine 44 to vary the pressure drop and, hence, the power produced by the low pressure turbine. Output gases from the low pressure turbine 44 are vented to atmosphere through the outlet 58.

The low pressure turbine 44 has a unitary rotor 59 and output shaft 60 connected through a speed reduction unit 62 the output of which is mechanically coupled to the crankshaft 18. The speed reduction unit 62 mounts directly on the low pressure turbine unit 44 and is lubricated by a common system. The speed reduction unit 62 consists of a ring gear, three planet gears and a sun gear to provide a very low friction, 10:1 speed reduction on the same shaft centerline as the low pressure turbine 44. A 2:1 speed reduction is accomplished in the pulley and V-belt arrangement 64 connecting the output of the speed reduction unit 62 with the crankshaft 18. A flywheel 66 weighing approximately 120 pounds is also mounted on the crankshaft 18 which provides rotary shaft output power from the compound engine 10.

The scotch yoke 20 is rigidly connected to the pistons 22 and the centrally located rectangular slot 26 extends longitudinally in a direction perpendicular to the stroke of the opposed pistons 22. That arrangement has several advantages. First, the Scotch yoke 20 provides positive guidance for the pistons 22 as they reciprocate in the cylinders 14, thereby minimizing the lateral forces between the pistons 22 and the cylinders 14. Therefore, friction and wear between the piston rings (not shown) and cylinders 14 is minimal. Second, for uncooled operation, the top of the piston and cylinder can approach 1700° F. With the rigid scotch yoke 20, the pistons 22 are guided within the cylinder 14 by clearance control on the cool and lubricated base of the piston. With the scotch yoke 20, piston skirts can be very short and provide guidance for the piston 22. A clearance between the piston and cylinder above the skirt, for example 0.005 inches, can be maintained causing no additional rubbing of the hot piston and cylinder parts. Third, the expansion forces of combustion of one piston is transferred directly as a compression force to the opposing piston. In addition, with an eight cylinder unit, two of the scotch yokes 20 are always moving at the same speed, but in opposite directions, which results in a balanced reciprocating unit. Preferably the scotch yoke is made from aluminum or composite material and has a total reciprocating mass of approximately 14 pounds or less.

To summarize the operating cycle, referring to FIGS. 1–3, with the above compound engine, high volume, low pressure air is compressed by a total ratio of approximately 200:1. The cycle air is first compressed by a ratio of approximately 5:1 by the rotating high pressure compressor 38 after which air flows through the combustors 42, the intake manifold 32, intake ports 34 and into the cylinders 14 of the piston units 12. The air is further compressed by a ratio of approximately 40:1 to a higher pressure at nearly one hundred percent (100%) efficiency when the piston units 12 are operating at full power. The compression ignites fuel injected into the cylinders 14 near the top dead center portion of the piston cycle, and the energy of the combusting and expanding gases is extracted to the maximum extent possible at nearly one hundred percent (100%) efficiency by the piston units 12 through a crankshaft rotation of approximately 95° past top-dead center and an additional 30° during the opening of the exhaust valve 110. When the gases have been fully expanded in the cylinders 14 and combined with the cooling and scavenge air, they are returned through the combustors 42, to drive the high pressure turbine 40 which in turn rotates the high pressure compressor 38. Energy remaining in the exhaust gases from the piston units 12 is extracted in the low pressure turbine 44 which is connected through the gear reduction unit 62 and a V-belt unit 64 to the output of the crankshaft 18.

Figure 4:
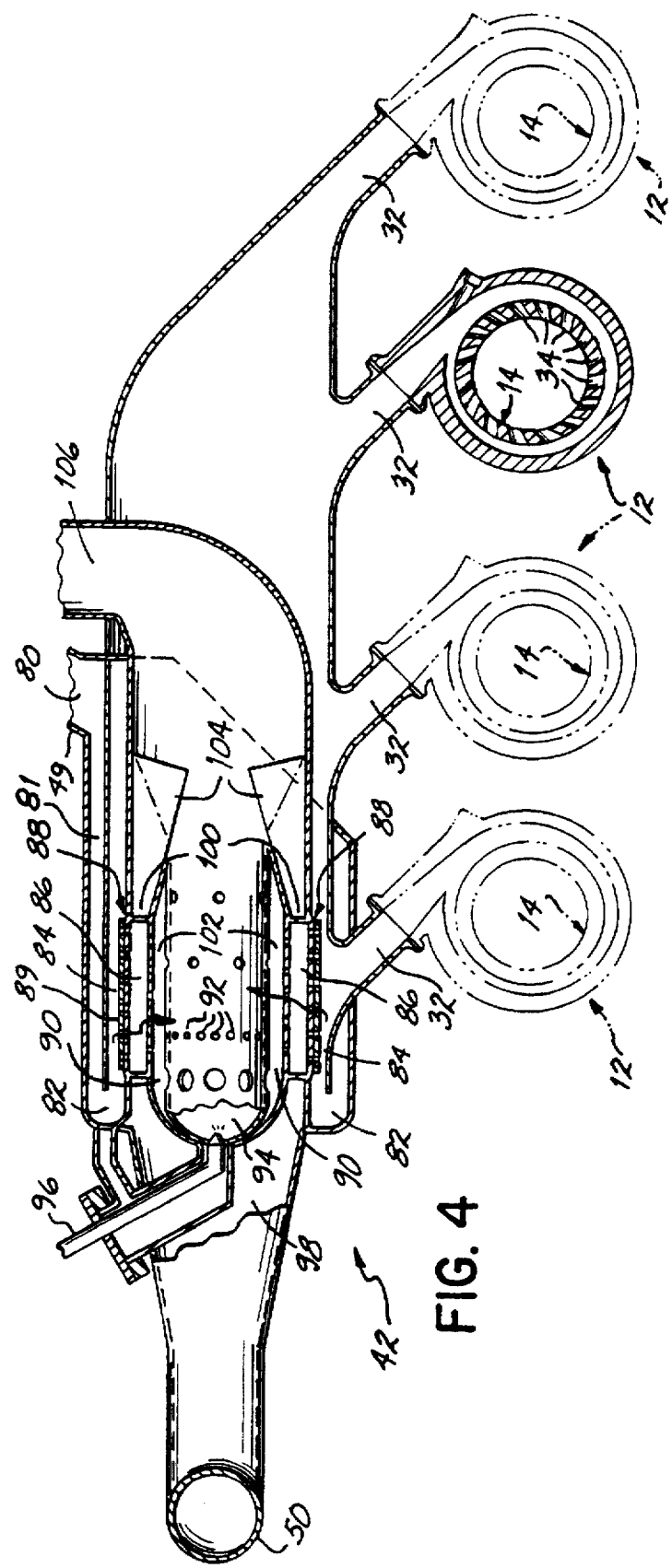
FIG. 4 is a schematic cross-sectional view of one of the combustors of the engine of FIG. 1.

The two-stroke cycle of the piston unit 12 is important because the cycle air flow characteristics of the two-stroke cycle more nearly match the continuous gas flow characteristics of the gas turbine unit 36. For instance, the intake and exhaust valves of the piston unit 12 are open for large portions, for example, one-third, of the rotation of the crankshaft 18. The cycle air flow within the compound engine 10 is unique because of the parallel flow paths provided by the combustors 42. As shown in FIG. 4, cycle air from the high pressure compressor 38 enters an outer first inlet 80 intersecting a cylindrical flow path 81 at the rear end of the combustors 42 and flows to its forward end. The cycle air then passes through annular port 82 and into a second cylindrical flow path 84. The second cylindrical flow path 84 provides a first air outlet that intersects the intake manifold 32 and radially extending struts or air passages 86 of a circumferential valve 88. The circumferential valve 88 includes a sleeve 89 which is slidably located over the struts 86 and has openings matching the openings of the strut air passages 86. During normal engine operation the sleeve 89 of the circumferential valve 88 is rotated to a position that closes but does not seal the air passages 86, and the air flows from the annular passage 80, through the intake manifold 32 and into ports 34. The sleeve 89 of the circumferential valve 88 is rotated to open the strut air passages 86 when operating bypass burners, or heaters, within the combustors 42 of the gas turbine 36. With the combustor operation, the air passages 86 intersect in an inner cylindrical air flow channel 90 which by means of cycle air ports 92 provide combustion air to a combustion chamber 94 comprising the bypass burner, or heater, within the combustors 42. Fuel is injected into the combustion chamber 94 by means of an injection line 96. Burning fuel in the thermal reactors, or combustors 42 produces exhaust gases to the second outlet passage 106 which operate as driving gases for the high pressure turbine 40. The bypass burners in the combustors 42 are ignited when starting the piston unit 12 or when it is desirable to provide a power boost to the compound engine 10. A unique feature of the compound engine 10 is the parallel air flow paths within the combustors 42. For example, cycle air can flow both to the piston unit 12 and to the combustion chambers 94 of the combustors 42. By simultaneously operating the piston unit 12 and burning fuel in the bypass burners or combustion chambers 94 of the turbine unit 36, both units 12, 36 supply driving gases to the high pressure turbine 40 which in turn, provide a substantial increase in the driving gases to the low pressure turbine 44. The output drive shaft 60 from the input 45 of the low pressure turbine 44 adds significant power to the crankshaft 18 from which the output power from the compound engine 10 is taken.

In another flow path, exhaust cycle gas from combustion within the cylinders 14 exits the cylinders 14 via exhaust manifold 50 and enters a second inlet of the combustors at 98. The exhaust cycle gas from the piston unit 12 flows through longitudinal passages 100 that extend between the struts or radial air passages 86. At the other end of the combustors 42, the exhaust cycle gas and the intake cycle air flowing through the cylindrical longitudinal air passage 102 pass through a daisy mixer 104 which breaks the exhaust cycle gas and intake cycle air into smaller streams so that they more quickly mix and merge into outlet passage 106 that is connected to the inlet of the high pressure turbine 40.

Air from the high pressure compressor 38 flows through the combustors 42 to both the intakes of the open cylinders on the piston unit 12 and to the high pressure turbine 40. This operation provides compressed and heated air to the intake manifold 32 and torque to the crankshaft 18 through the low pressure turbine 44 which is fluidly coupled to the high pressure turbine 40. A unique aspect of the parallel flow path provided through the combustors 42 is that the gas turbine 36 may be started and operated independently of the piston unit 12 thereby providing the advantages of easy starting and internal cooling flow path control.

The unique air flow configuration is possible because both the gas turbine unit and the two-stroke, uniflow scavenge piston unit have a total pressure drop across the system to enable operation. Typical gas turbines have a pressure drop between the compressor and turbine of approximately five percent (5%). Recuperated turbines are higher. The pressure drop across a typical two-stroke cylinder varies with the valving arrangement, speed and power setting. For an unit with a fixed displacement scavenge compressor, the pressure ratio can vary from very low values at idle to perhaps forty percent (40%) at full power and full speed. Preferably, for surface or over land applications of the compound engine 10, an approximately 5:1 pressure ratio high pressure compressor 38 with an approximately eight-two percent (82%) peak efficiency is preferred. The compressor efficiency is an important parameter for a gas turbine and diesel compound engine. Since the compressor 38 provides air to the piston unit at about 400° F., a lower pressure ratio will reduce the exhaust energy recovered in the high pressure turbine 40. On the other hand, a higher pressure ratio requires the piston compression ratio to be lowered to maintain reasonable peak cylinder pressure. In addition, as the compressor ratio increases, the air temperature furnished to the piston unit 12 increases thereby reducing the cooling capabilities of that air. Further, the temperature of the cycle air at the intake manifold has a large effect on the volumetric efficiency, or the ability of the cylinder to obtain a sufficient charge of air on each stroke.

With the pressure ratio across the cylinder of the piston unit 12 at about five percent (5%), and piston air flow varying as a function of the pressure drop and speed of the piston unit 12, variable area nozzles are used on both the high pressure turbine 40 and low pressure turbine 44. Therefore, the high pressure rotor operates at one hundred percent (100%) or full speed from full power down to about twenty percent (20%) power. With the high pressure rotor operating at full speed over most of the power range, high pressure air is furnished to the intake manifold 32; and a five percent (5%) pressure drop is maintained across the cylinder 14 at most power settings. With this arrangement, the scavenge ratio will vary from about five hundred percent (500%) near idle to one hundred twenty percent (120%) at full power and full speed. The scavenge ratio or trapping efficiency is highly influenced by the speed of the piston unit 12. Scavenge efficiency is also influenced by the scavenge ratio.

One of the design objectives of the compound engine 10 is to minimize the engine cooling and optimize the use of heat which is created during the compression combustion process. Therefore, preferably, the internal piston and cylinder surfaces must tolerate the 1500° F.–1700° F. surface temperatures. The efficiency and performance of the compound engine 10 is improved by its high temperature operation. Further, the heat flow characteristics of the piston unit are improved because the relatively cool compressor discharge air enters the bottom of the cylinders 14 and the exhaust cycle gas leaves the cylinders at their top end (horizontally displaced from the inlet). This arrangement makes it easier to maintain a relatively cool area in the piston unit crankcase 108 of FIG. 3 to minimize heat transfer to the lubricating oil. It also provides an even circular temperature gradient in the cylinders thereby preventing deformation and distortion. Supplemental cooling is provided by the lubrication oil in the crankcase 108. A series of oil spray nozzles (not shown) are situated within the crankcase 108 to impinge oil on all scotch yoke bearing surfaces and on the underside of each piston 22. The crankshaft 18 is drilled to provide pressure lubrication to each main bearing and the internal slider bearings.

Because of the requirement for minimal internal cooling, a low pressure drop through the cylinder 14, a very high peak cylinder pressure, and hot metal temperatures, the compound engine 10 has several unique design features. First, the opposing cylinders 14 are exactly 180° apart and on the same centerline, and the cylinders are tied together with high-strength through bolts extending between the opposed cylinder heads. This provides for easy assembly and disassembly and relieves the longitudinal stress in the cylinder walls. This arrangement further provides larger intake port areas. The long, high-strength tie rods also permit the cylinder liner and head to be stacked in sections which permits for the easy insertion of insulating or low heat transfer gaskets, such as zirconia, if desired, to minimize the transfer of heat down the cylinder liner walls.

Second, the piston unit 12 is designed as a uniflow scavenge unit wherein the cylinder 14 and piston 22 are tapered toward the top, thereby reducing the internal volume of the combustion chamber at its upper end in order to provide several advantages. With the location of the intake ports 34 at the bottom of the cylinders and the exhaust valves 110 at the top of the cylinders, the design provides an initial swirl of the cycle air at the intake ports. The swirling pattern of the intake air continues as it rises through the cylinder 14 and accelerates as it is squeezed to a smaller and smaller diameter as it moves up the conical cylinder volume. The combustion chamber takes the shape of a small cylindrical plug with reduced surface to volume area ratio for a given clearance volume. These factors along with the high temperatures of the combustion chamber surfaces provide for a high heat release configuration. Further, the rate of heat release from the surfaces within the cylinder are greatest at those areas where the temperature is highest. In addition, the reduced volume at the upper end of the cylinder facilitates the compression ignition process. Advantageously, ignition delay is eliminated with operating surface temperatures over 1000° F.

The reduced diameter combustion chamber also facilitates the use of an annular exhaust valve 110 mounted within a bore 109 in the cylinder head 112 concentrically with the piston 22 (FIG. 3). With such a valve, the entire 360° circumference at the top of the cylinder is opened to provide an aerodynamically-shaped exhaust scroll providing a very low pressure drop across the cylinder. When the valve is closed, the distal end 111 of the exhaust valve 110 bears against and seats on an annular surface 113 within the cylinder head 112; and the combustion chamber is located inside the cylinder and the exhaust valve. The exhaust valve 110 also has an inside lip 114 on its cylindrical peripheral wall 15 which is oriented at an angle of approximately 30°

F. with respect to the horizontal and is used to provide a positive seating force during combustion when there is maximum pressure within the cylinder. An advantage of such a valve design is that scavenge efficiency is minimally from seventy percent to ninety percent. Further, depending on a combination of gas turbine and piston unit speed, the scavenge efficiency will reach one hundred percent (100%).

The exhaust valve 110 is mounted around and moves longitudinally with respect to a center body 116 which holds a fuel injector 118. Fuel injection is accomplished by utilizing an eight-plunger fuel pump (not shown) with cam plunger springs and governor to drive the eight fuel injectors. All eight high pressure fuel injection lines are identical in length so that all injector needle lift pressures are approximately the same, for example, 3200 psi. Sealing rings 120 are contained on both the center body and the cylinder head 112 to seal combustion gases from leaking past the exhaust valve 110 that is reciprocating therebetween. By mechanisms not shown, the center body 116 may be selectively moved a small displacement toward and away from the piston 22, thereby changing the size of the combustion chamber within the piston unit 12 and hence the compression ratio. Changing the compression ratio is beneficial when operating the piston unit 12 at very low speeds, for example, at idle.

Figure 5:
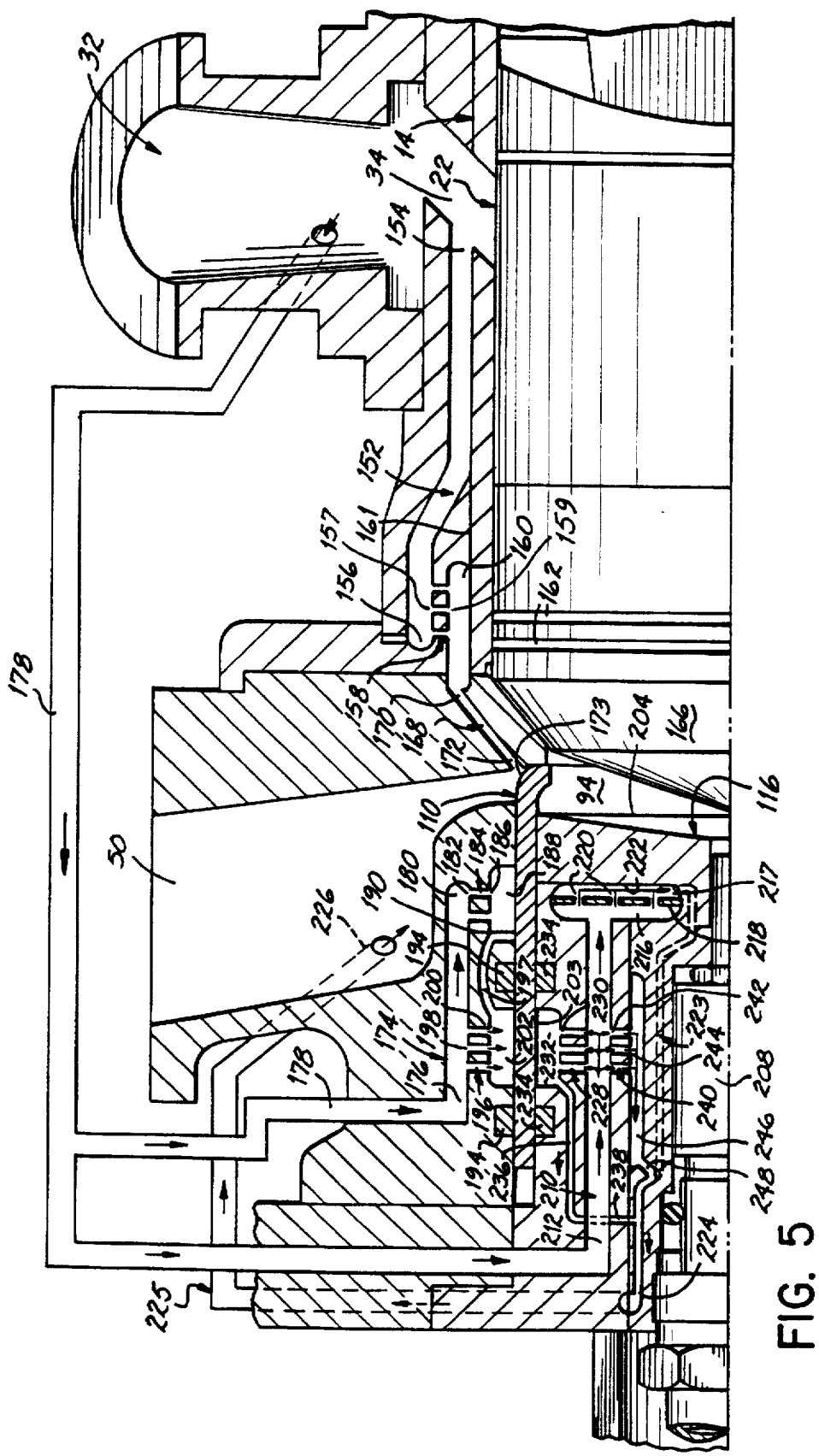
FIG. 5 is a partial cross-sectional view illustrating a piston and cylinder assembly utilizing the impingement cooling mechanisms in accordance with the principles of the present invention.

With the designed pressure drop across the piston unit, all cooling is provided by the cycle air; and except for cooling the scotch yoke lubrication, no external cooling mechanisms are used. Preferably impingement cooling is used by which the cycle air is expelled from an orifice at a high velocity to impinge on the heated surface to be cooled. The high velocity impingement cooling air jets are effective to penetrate and break up the laminar air flow that exists immediately adjacent the heated surface. Referring to FIG. 5, small amounts of cycle air are diverted through a first cooling passage 152 which may be either one or more drilled holes, or, an annular passage circumferentially surrounding the cylinder 14. One end 154 of the first cooling passage 152 intersects the intake manifold 32. The first cooling passage extends longitudinally with respect to the cylinder 14 and has a second end 156 intersecting first ends 157 of a first plurality of impingement cooling holes 158. The first plurality of impingement cooling holes 158 have second ends 159 which intersect an annular plenum 160 at the end of the cylinder 14 closer to the combustion chamber 94. Therefore, the first plurality of impingement cooling holes 158 receive cycle air and expel and impinge that cycle air at a high velocity against the outer surface 161 of the cylinder 14 thereby substantially reducing the temperature of the cylinder 14 at its end closer to the combustion chamber 94. Preferably, the plenum 160 and first plurality of impingement cooling holes 158 are located circumferentially around the outer surface 161 of the cylinder 14 at a point adjacent the location of the piston rings 162 when the piston 22 is at its top-dead-center position as illustrated in FIG. 5. The top-dead-center position of the piston 22 is that point where the piston 22 changes its direction at the top or end of its compression stroke. Providing impingement cooling at that point on the cylinder wall 14 permits the piston rings 162 to be mounted on the piston closer to the cap or head 166 of the piston 22. A second plurality of impingement cooling holes 168 have first ends 170 intersecting the plenum 160 for receiving cycle air. The second plurality of impingement cooling holes 168 have second ends 172 which expel and impinge high velocity cycle air adjacent the outer surface 173 of the end of the exhaust valve 110 when the exhaust valve 110 is closed. The heated cooling air then mixes with the piston unit exhaust gas in the exhaust manifold 50.

Further impingement cooling is provided by a second cooling passage 174 having a first end 176 in fluid communication with the intake manifold 32 by means of external tubing 178. The tubing 178 may be connected to other sources for supplying cycle air to the second cooling passage 174. For example, the source of cycle air may be tapped from a cycle air passage in combustor 42 or the output path 49 of the compressor 38. A second end 180 of the second cooling passage 174 intersects first ends 182 of a third plurality of impingement cooling holes 184 which have second ends 186 expelling and impinging cycle air at a high velocity through the plenum 188 and against an outer surface 190 of the exhaust valve 110 towards its distal end 111 located close to the combustion chamber 94. The second cooling passage 174 may be either one or more drilled holes or, an annular passage circumferentially surrounding the exhaust valve 110; and the third plurality of impingement cooling holes 184 and plenum 188 extend circumferentially around the outside of the exhaust valve 110. The heated cooling air within the second plenum 188 moves along the outside surface 190 of the exhaust valve 110 until it enters the exhaust manifold 50 and mixes with the piston unit exhaust gases.

Sealing rings 194 are mounted within the cylinder head and are in sliding contact with the outer surface 190 of the reciprocating exhaust valve 110. The sealing rings 194 help guide the exhaust valve 110 along its desired reciprocating path. A fourth plurality of impingement cooling holes 196 have first ends 198 intersecting the second cooling passage 174 for receiving the cooling cycle air therefrom. The fourth plurality of impingement cooling holes 196 have second ends 200 intersecting an annular third plenum 202. Preferably, the fourth plurality of impingement cooling holes 196 and the third plenum 202 extend circumferentially around the outside of the exhaust valve 110. Further, the third plenum 202 is preferably located between the sealing rings 194. The fourth plurality of impingement cooling holes 196 expel and impinge high velocity cooling air against the outer surface 190 of the exhaust valve 110 between the sealing rings 194 thereby providing further cooling. The heated cooling air within the third plenum 202 passes through the air passage 197 into the second plenum 188, and thereafter, moves along the outside surface 190 of the exhaust valve 110 until it enters the exhaust manifold 50 and mixes with the piston unit exhaust gases.

To provide further cooling, the center body 116 contains cooling air passages and impingement cooling holes to selectively cool an inner surface 203 of the exhaust valve 110, the end 204 of the center body 116 and fuel passing through a fuel injector line 208. The center body 116 contains a third cooling passage 210 having a first end 212 connected to tubing 178 and in fluid communication with the cycle air in the intake manifold 32. As previously described, the third cooling passage 210 may be connected to the intake manifold 32 or to any other source of the cycle air. The passage 210 may be either one or more holes or drilled holes, or, an annular passage extending circumferencially and longitudinally within the center body 116. The passage 210 intersects an intake plenum 216 located adjacent the end 204 of the center body 116. A circular disk or member 218 is mounted within the intake plenum 216 and separates the intake plenum 21 6 from an exhaust plenum 217. The disk 218 has a fifth plurality of impingement cooling holes 220 that expel and impinge the cycle air at a high velocity against an inner surface 222 adjacent the end 204 of the center body 116. The end 204 of the center body 116 is immediately adjacent the combustion chamber 94; and therefore, this impingement cooling is effective to reduce the temperature of the hottest portion of the center body 116. A cooling air exit passage 223 has one end intersecting the exhaust plenum 217 and extends longitudinally through the center body 116. The cooling air exit passage 223 has an opposite end 224 connected to one end of hard or soft tubing 225 the other end 226 of which is in fluid communication with the input of the high pressure turbine 40. Preferably, the other end 226 of the tubing 225 is connected to and conducts the heated cooling air to the exhaust manifold 50 where it mixes with piston unit exhaust gases.

A sixth plurality of impingement cooling holes 228 have a first end intersecting the fourth cooling passage 210 for receiving the cooling cycle air therefrom. Second ends 230 of the sixth plurality of impingement cooling holes 228 expel and impinge the cycle air at a high velocity through the plenum 232 and against an inner surface 203 of the exhaust valve 110. Preferably, the plenum 232 is annular in shape and extends with the sixth plurality of impingement cooling holes 228 circumferentially around the outside surface of the center body 116. The center body further has sealing rings 234 mounted in the outer surface of the center body 116 and in contact with the inner surface 203 of the exhaust valve 110 reciprocating with respect to the center body 116. Preferably the sealing rings 234 are located immediately adjacent the sealing rings 194 contacting the outer surface 190 of the exhaust valve 110. Further, the plenum 232 is preferably located between the sealing rings 234 and immediately adjacent the plenum 202 located on the outside surface of the exhaust valve 110.

A cooling air exit passage 236 has one end intersecting the fifth plenum 232 and extends longitudinally through the center body 116. The cooling air exit passage 236 has another end 238 in fluid communication with the input of the high pressure turbine 40. Preferably the other end 238 of the exit passage 236 is connected to the tubing 225 which conducts the heated cooling air from the center body 116 to the exhaust manifold 50.

A seventh plurality of impingement cooling holes 240 have a first end intersecting the fourth cooling passage 210 for receiving the cooling cycle therefrom. Second ends 244 of the seventh plurality of impingement cooling holes 240 expel and impingement the cycle air at a high velocity through a plenum 246 and against an inner surface 248 of the center body 116 which is adjacent the fuel injector line 208. Preferably, the plenum 246 is annular in shape and extends with the seventh plurality of impingement cooling holes 240 circumferentially around the fuel injector line 208. The seventh plurality of impingement cooling holes 240 help maintain the fuel within the fuel injector line 208 at a desired temperature. A cooling air exit passage 248 extends between and intersects the plenum 246 and the cooling air exit passage 223 which in turn conducts the heated cooling air to the exhaust manifold 50.

In use the impingement cooling mechanisms heretofore described provide several advantages. First, the impingement cooling of the upper cylinder wall permits the piston rings 162 to be mounted on the piston 22 adjacent the outer end of the piston 22 close to the cap 166. The cooling further permits a smaller cap 166. The net results is a piston that is substantially shorter than in prior designs and having a smaller mass which improves the efficiency of the engine. In addition, the length of the cylinder is likewise reduced and the cylinder wall thicknesses may reduce thereby reducing weight. Impingement cooling on both the inner and outer surfaces of the exhaust valve provide longer valve life. A further advantage of the impingement cooling mechanisms is that a more efficient cooling is provided with less cycle air. For example, the flow rate of cycle air diverted the two cooling purposes may be reduced up to approximately 50% versus the quantity of diverted cycle air used in prior designs of the compound engine described herein.

While the invention has been set forth by a description of the preferred embodiment in considerable detail, it is not intended to restrict or in any way limit the claims to such detail. Additional advantages and modifications will readily appear to those who are skilled in the art. For example, the size of the impingement cooling holes 158, 168, 184, 196, 220, 228, and 240 is preferably in the range of from approximately 0.001 inch to approximately 0.005 inch in diameter. However, the size of those impingement cooling holes and their associated plenum and the number of holes at any location will vary with the demands of the cooling application, the physical space available, cost of manufacturing, etc. Further, the impingement cooling mechanisms of the present invention may be used with any type of piston unit in a compound engine, for example, a two stroke or four stroke piston unit, or a gas or diesel piston unit. The invention therefore in its broadest aspects is not limited to the specific details shown and described. Accordingly, departures may be made from such details without departing from the spirit and scope of the invention.

What is claimed is:

1. A compound engine comprising:
 a gas turbine unit including
  a compressor receiving ambient air for providing cycle air,
  a first turbine connected to and driving the compressor, and
  a second turbine having an input fluidly coupled to an output of the first turbine; and
 a piston unit including
  an intake manifold receiving the cycle air provided by the compressor,
  an exhaust manifold in fluid communication with and providing cycle gas to the first turbine,
  a crankshaft mechanically coupled to the second turbine,
  a plurality of piston and cylinder assemblies, each of the plurality of piston and cylinder assemblies including
   a cylinder bore surrounded by a cylinder wall,
   a piston slidably mounted in the cylinder bore and having annular piston rings in sliding contact with the cylinder wall, the piston having one end operatively connected to the crankshaft for reciprocating motion within the cylinder bore,
   an intake port in fluid communication with the intake manifold, the intake port being located in the cylinder wall proximate a bottom dead center position of a respective piston,
   a first plurality of impingement cooling holes having first ends in fluid communication with the intake manifold for receiving cycle air, and second ends expelling and impinging cycle air at a high velocity on an outer area of a respective cylinder wall at a first location generally adjacent the piston rings of a respective piston located at a top dead center position.

2. The compound engine of claim 1 further comprising a first cooling passage having one end intersecting the first ends of the first plurality of impingement cooling holes and having a second end in fluid communication with the intake manifold.

3. The compound engine of the claim 2 wherein the one end of the first cooling passage within each of the plurality of piston and cylinder assemblies intersects the intake manifold at a location adjacent the intake port.

4. The compound engine of claim 3 wherein the first cooling passage extends along an outer surface of the cylinder wall in a generally longitudinally direction with respect to the cylinder wall.

5. The compound engine of claim 4 wherein the first cooling passage is annular in shape and extends generally circumferentially around the outer surface of the cylinder wall.

6. The compound engine of claim 1 wherein the piston rings are mounted on respective pistons at locations adjacent opposite ends of the pistons and wherein further, each of the plurality of piston and cylinder assemblies further comprises an annular plenum extending circumferentially around an outside surface of the cylinder wall at the first location and the second ends of the plurality of impingement cooling holes intersecting the annular plenum.

7. The compound engine of claim 6 wherein each of the plurality of piston and cylinder assemblies further comprises:
    an exhaust valve reciprocating in response to rotation of the crankshaft between a first position permitting a flow of cycle gas from the intake port through the cylinder bore to and past the exhaust valve and a second closed position where the exhaust valve is in sealing contact with a valve seat thereby prohibiting cycle gas from flowing past the exhaust valve; and
    second impingement cooling holes in fluid communication with the intake manifold for conducting the cycle air therethrough, the second impingement cooling holes having second ends located adjacent the valve seat for expelling impinging cycle air at a high velocity on an outer area of the exhaust valve when the exhaust valve is in the second closed position.

8. The compound engine of claim 7 wherein the first ends of the second impingement cooling holes intersect the annular plenum.

9. A compound engine comprising:
    a gas turbine unit including
        a compressor receiving ambient air for providing cycle air,
        a first turbine connected to and driving the compressor, and
        a second turbine having an input fluidly coupled to an output of the first turbine; and
    a piston unit including
        an intake manifold receiving the cycle air provided by the compressor,
        an exhaust manifold in fluid communication with and providing cycle gas to the first turbine,
        a crankshaft mechanically coupled to the second turbine,
        a plurality of piston and cylinder assemblies, each the plurality of piston and cylinder assemblies including
            a piston operatively connected to the crankshaft,
            a hollow cylindrical exhaust valve mounted concentrically with a respective piston within a bore at one end of the piston and cylinder assembly, the exhaust valve reciprocating between alternating open and closed positions,
            a first sealing ring located in the bore and in contact with an outer surface of the reciprocating exhaust valve,
            a cylindrical center body member mounted within the reciprocating hollow cylindrical exhaust valve, the cylindrical center body having one end bounding a portion of a combustion chamber,
            a second sealing ring mounted in an outside surface of the center body and in contact with an inner surface of the reciprocating exhaust valve,
            a first plurality of impingement cooling holes having
                first ends in fluid communication with the intake manifold for receiving cycle air, and
                second ends expelling and impinging cycle air at a high velocity on the outer surface of the exhaust valve between the first sealing ring and a distal end of the exhaust valve proximate the piston.

10. The compound engine of claim 9 further comprising a first cooling passage having one end in fluid communication with the intake manifold for conducting cycle air therethrough and another end intersecting the first ends of the first plurality of impingement cooling holes.

11. The compound engine of claim 9 wherein the distal end of the exhaust valve bounds a portion of a combustion chamber when the exhaust valve is in the closed position and the second ends of the plurality of impingement cooling holes expel high velocity cycle air on an outer surface of the distal end of the exhaust valve.

12. The compound engine of claim 11 wherein each of the plurality of piston and cylinder assemblies further includes a first plenum area adjacent the distal end of the exhaust valve and intersecting the second ends of the first plurality of impingement cooling holes.

13. The compound engine of claim 12 further comprising a second plurality of impingement cooling holes having first ends in fluid communication with the intake manifold, the second plurality of impingement cooling holes having second ends expelling high velocity cycle air to impinge the outer surface of a respective exhaust valve at a location between the first sealing ring and an opposite end of the exhaust valve.

14. The compound engine of claim 13 wherein the first ends of the second plurality of impingement cooling holes intersect the first cooling passage and the second ends of the second plurality of impingement cooling holes intersect a second plenum at the second location.

15. The compound engine of claim 14 wherein the exhaust valves are cylindrically shaped and the first cooling passage is an annular passage.

16. The compound engine of claim 15 wherein the first and second plenums are annular in shape and extend generally circumferentially around an outside surface of the cylindrical exhaust valves.

17. The compound engine of claim 14 further comprising a cooling air exit passage extending from the second plenum to an input of the first turbine.

18. A compound engine comprising:
    a gas turbine unit including
        a compressor receiving ambient air for providing cycle air,
        a first turbine connected to and driving the compressor, and
        a second turbine having an input fluidly coupled to an output of the first turbine; and
    a piston unit including
        an intake manifold receiving the cycle air provided by the compressor,
        an exhaust manifold in fluid communication with and providing cycle gas to the first turbine,
        a crankshaft mechanically coupled to the second turbine, a plurality of piston and cylinder assemblies, each of the plurality of piston and cylinder assemblies including
- a cylinder bore surrounded by a cylinder wall,
- a piston slidably mounted in the cylinder bore and having one end operatively connected to the crankshaft for reciprocating motion within the cylinder bore,
- a hollow cylindrical exhaust valve slidingly mounted in the respective piston and cylinder assembly, the exhaust valve reciprocating between open and closed positions,
- a cylindrical center body member mounted within and in a sliding relationship with respect to the reciprocating hollow cylindrical exhaust valve, the cylindrical center body having one end bounding a portion of a combustion chamber,
- a first plurality of impingement cooling holes having first ends in fluid communication with the intake manifold for receiving cycle air, and second ends expelling high velocity cycle air impinging on an internal surface of the center body member.

19. The compound engine of claim 18 further comprising a first cooling passage having one end intersecting the first ends of the first plurality of impingement cooling holes and having a second end in fluid communication with the intake manifold.

20. The compound engine of claim 18 wherein the internal surface of the center body member is adjacent the one end of the center body member.

21. The compound engine of claim 20 wherein each of the plurality of piston and cylinder assemblies further comprises a first plenum area at the one end of the cylindrical center body member intersecting the first plurality of impingement cooling holes.

22. The compound engine of claim 21 wherein each of the plurality of piston and cylinder assemblies further comprises a first exit passage having one end intersecting the first plenum and having another end in fluid communication with an input of the first turbine.

23. The compound engine of claim 9 wherein each of the plurality of piston and cylinder assemblies further comprises a second plurality of impingement cooling holes having first ends in fluid communication with the intake manifold for receiving cycle air and second ends expelling high velocity cycle air impinging on an internal surface of the hollow cylindrical exhaust valve.

24. The compound engine of claim 23 wherein at least one sealing ring is mounted on an outer surface of the cylindrical center body member and in sliding and circumferential contact with the inside surface of the hollow cylindrical exhaust valve.

25. The compound engine of claim 24 wherein the cylindrical center body member further comprises a second plenum located adjacent at least one of the sealing rings and intersecting the second ends of the second plurality of impingement cooling holes.

26. The compound engine of claim 25 further comprising a second exit fluid passage having one end intersecting the second plenum and another end in fluid communication with an input of the first turbine.

27. The compound engine of claim 9 wherein the center body member has a fuel line running therethrough and each of the plurality of piston and cylinder assemblies further comprises a third plurality of impingement holes having first ends in fluid communication with the intake manifold for receiving cycle air and second ends expelling high velocity cycle air impinging on an inner surface of the center body member adjacent the fuel line.

28. The compound engine of claim 27 wherein each of the plurality of piston and cylinder assemblies further comprises a third cooling passage having one end intersecting the first ends of the third plurality of impingement cooling holes and having a second end in fluid communication with the intake manifold.

29. The compound engine of claim 28 wherein each of the plurality of piston and cylinder assemblies further comprises a third plenum area intersecting the second ends of the third plurality of impingement cooling holes the third plenum area being cylindrically shaped and surrounding the fuel line.

30. The compound engine of claim 29 further comprising a third exit fluid passage having one end intersecting the third plenum and an opposite end in fluid communication with an input of the first turbine.

* * * * *